(No Model.)
I. McC. McGONIGLE.
WAGON LOCK.
No. 376,329. Patented Jan. 10, 1888.
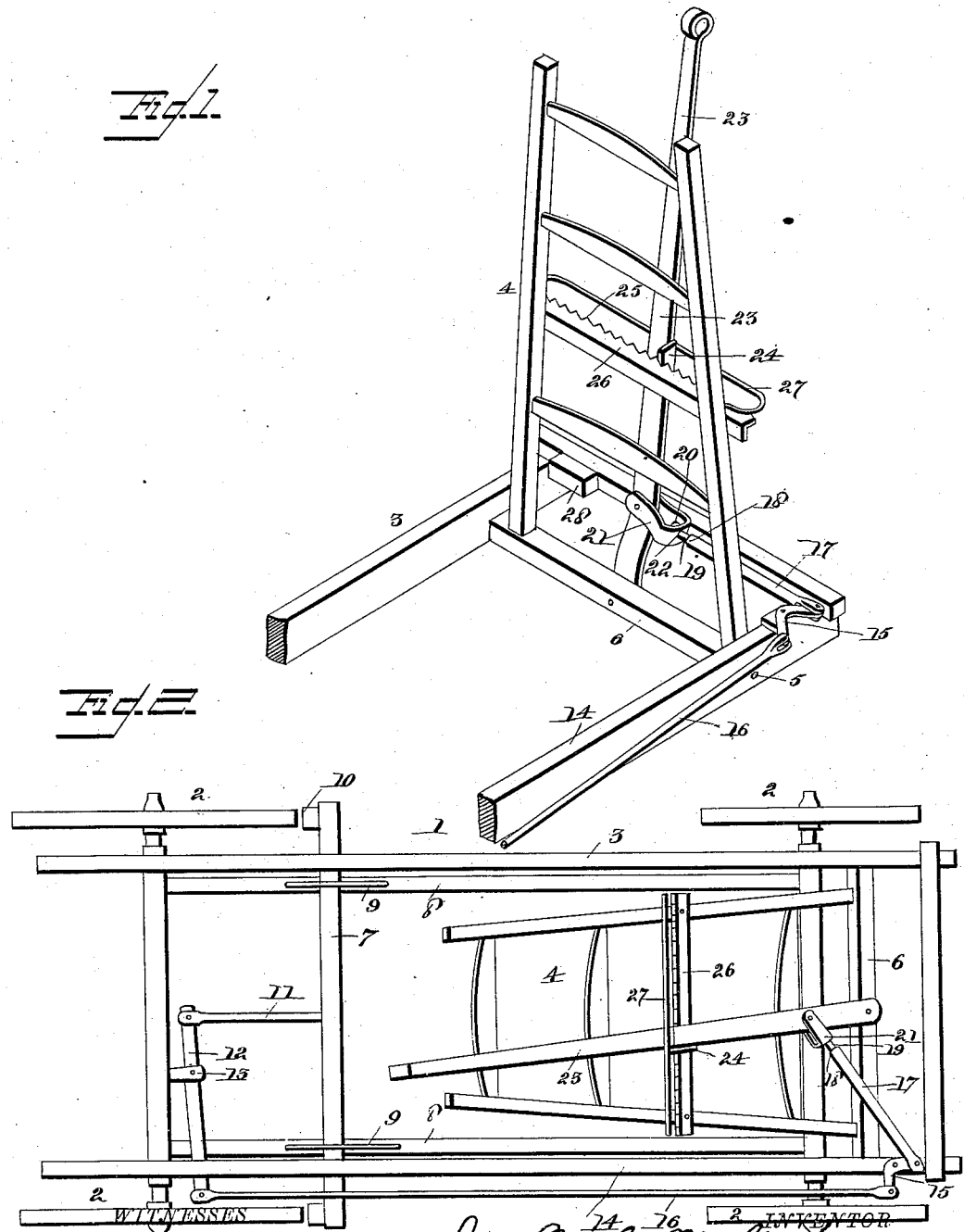

UNITED STATES PATENT OFFICE.

IRA McC. McGONIGLE, OF SHANESVILLE, OHIO.

WAGON-LOCK.

SPECIFICATION forming part of Letters Patent No. 376,329, dated January 10, 1888.

Application filed October 11, 1887. Serial No. 252,040. (No model.)

*To all whom it may concern:*

Be it known that I, IRA McC. McGONIGLE, a citizen of the United States, and a resident of Shanesville, in the county of Tuscarawas and State of Ohio, have invented certain new and useful Improvements in Locking Devices for Hay-Wagons; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the front half or end of a hay-wagon provided with my invention, showing the device in position for locking the wagon-brake from the top of a load of hay; and Fig. 2 is a top plan view of the entire wagon, showing the device folded down to lock the wagon-brake when the load is off.

The same numerals of reference indicate corresponding parts in both the figures.

My invention consists in a new and improved device for locking the brake of hay-wagons from the top of the load when loaded, and also for locking the brake when the wagon is unloaded, and my invention will be hereinafter fully described and claimed.

Referring to the several parts by their designating-numerals, 1 indicates the usual wagon-body proper, which is mounted on the ordinary wheels, 2.

3 indicates the hay ladder or frame, which is supported upon the bolsters of the wagon-body in the usual manner. At the front end of the hay-frame 3 is hinged the end ladder, 4, the ends 5 5 of the bottom cross-piece, 6, of which are rounded and are journaled in the forward end portions of the longitudinal parallel sills or side pieces of the hay-frame 3, as shown. It will be seen that this end ladder, thus hinged at the bottom, can be turned up into a vertical position when the hay is to be loaded on the wagon, as shown in Fig. 1 of the drawings, or can be turned down in upon the bottom of frame 3 when the wagon is empty, as shown in Fig. 2.

7 indicates the brake-bar, which extends transversely across and slides upon the lower side pieces, 8 8, of the wagon-body, its motion or play being limited by the guide rods or clips 9 9. At each end this brake-bar, which is mounted and slides in front of the rear wheels of the wagon, is provided with the brake-shoes 10 10, which are adapted to come into contact with the peripheries of the rear wheels. In the center of this sliding brake-bar is rigidly secured the forward end of a short rod, 11, the rear end of which is bifurcated, and in this bifurcated rear end is pivoted the inner end of a lever, 12, which is pivoted in a bearing, 13, toward its inner end.

Upon the right-hand sill, 14, of the hay-frame 3, near the front end of the same, is centrally pivoted a bell-crank lever, 15, the outer rear end of which is pivoted in the bifurcated forward end of a connecting-rod or pitman, 16, and in the rear bifurcated end of this pitman is pivoted the outer end of the lever 12, as shown. To the forward end of the bell-crank lever 15 is pivoted the outer bifurcated end of a connecting-arm, 17, the inner end of which is shouldered at 18, forming the neck 19, terminating in the head 20. On this neck is swiveled the stirrup 21, through the central aperture, 22, of which the said neck of the arm 17 passes. This neck 19 of the arm is twice or three times as long as the thickness of the metal of the stirrup, through which it passes, for the purpose hereinafter specified.

Upon the bottom cross-piece, 6, of the end ladder, 4, is pivoted the lower end of the locking or brake lever 23, which is of such a length that its rounded upper end extends up above the top of the end ladder, 4, so that when the wagon is filled with hay the upper free end of this lever will extend up clear within convenient reach from the top of the load of hay. At a suitable distance above its bottom pivotal point the lever has pivoted to it the ends of the stirrup 21, as shown, and above this point the lever is formed with the rearwardly-extending catch-lip 24, which is adapted to engage with any one of the series of teeth 25, formed on a rack, 26, which is secured transversely upon the forward side of the end ladder at the proper height, while a guard-bail, 27, extends outside of the lever from the end ladder, as shown, and confines the motion of the lever within proper limits.

It will be seen that in operation, when the wagon is to be loaded with hay, after being drawn to the proper spot, the end ladder is turned up into its vertical position, when one of its side pieces comes in contact with a stop-block, 28, on the end of the hay-frame 3, which prevents the stirrup and the lower end of the lever from being cramped against the front end cross-piece of the frame 3. When the wagon is loaded with hay, the upper end of the lever will project up within convenient reach of the driver, so that he can at any time stop the wagon or put on the brake on down-grades, &c., without dismounting or without another person being employed to manage the brake, it being only necessary for him to force the brake handle or lever 23 to the left, where it will be held by the rack 26 engaging with the bent catch-lip 24, and as the upper end of the lever 23 is thus pushed to the left hand it will, through the connecting arm 17, swing the forward end of the bell-crank lever 15 in, and thus pull its rear end forward, drawing the pitman 16 forward, and thus, through the rear lever, 12, forcing the brake-bar back, so that the brake shoes on the ends of the same will be pressed tightly against the rear wheels. The brake can be unlocked in a moment by pushing the lever 23 out at its upper end until the catch-lip 24 is freed from the teeth 25 of the rack 26, when the lever can be readily pushed to the right hand of the driver, thus unlocking the brakes. When the wagon is empty of hay, the end ladder, 4, is folded in and down, so as to rest upon the bed of the hay-frame 3, where it is out of the way. Now, owing to the neck 19 of the arm 17 being twice or three times as long as the thickness of the metal of the stirrup 21, through which it passes, it will be seen that the swiveled stirrup will have sufficient play to permit it to fold down with the end ladder when the lever 23 is swung down therewith, and also to permit of the device being operated to lock the brakes on when the ladder and lever are thus folded down and in. The lever can then be as readily operated and slid to either side, and will operate the brakes in the same manner as before described, the peculiar construction of the coupling between the stirrup and arm 17 preventing any binding and enabling the parts to work freely.

From the foregoing description, taken in connection with the accompanying drawings, the construction, operation, and advantages of my invention will be readily understood.

It will be seen that my new and improved device is simple and strong in construction and exceedingly convenient and efficient in its operation. The brake can thus be locked equally well both when the wagon is full of hay and when empty, and is never in the way.

Having thus described my invention, what I claim, and desire to secure by Letters Patent of the United States, is—

1. The combination, with a wagon having the swinging or movable end ladder, of the brake-bar having the end brakes and the rearwardly-extending rod, the pivoted rear lever, the connecting-rod, the bell-crank lever, the arm having the shouldered neck and head, the stirrup, and the long pivoted lever, substantially as set forth.

2. The combination, with a wagon having the swinging or movable end ladder, of the brake-bar having the end brakes and the rearwardly-extending rod, the pivoted rear lever, the connecting-rod, the bell-crank lever, the arm having the shouldered neck and the head, the stirrup, the long pivoted lever formed with the side lip, the toothed rack, and the guard-bail, substantially as and for the purpose set forth.

3. The combination, with the wagon having the swinging or movable end ladder, of the brake-bar having the end brakes and the rearwardly-projecting rod, the guide-bails for the brake-bar, the pivoted rear lever, the connecting-rod, the bell-crank lever, the arm having the shouldered neck and the head, the stirrup, the stop for the hinged end ladder, the long pivoted lever formed with the side lip, the toothed rack, and the guard-bail, substantially as and for the purpose set forth.

In testimony that I claim the foregoing as my own I have hereunto affixed my signature in presence of two witnesses.

IRA McC. McGONIGLE.

Witnesses:
JOHN H. PENROD,
JONAS PENROD.